(12) United States Patent
Freedman

(10) Patent No.: US 7,482,811 B2
(45) Date of Patent: Jan. 27, 2009

(54) MAGNETO-OPTICAL METHOD AND APPARATUS FOR DETERMINING PROPERTIES OF RESERVOIR FLUIDS

(75) Inventor: Robert Freedman, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 272 days.

(21) Appl. No.: 11/558,521

(22) Filed: Nov. 10, 2006

(65) Prior Publication Data

US 2008/0111551 A1    May 15, 2008

(51) Int. Cl.
    *G01V 3/18*    (2006.01)
(52) U.S. Cl. .................................................... 324/324
(58) Field of Classification Search ............... 324/324, 324/244, 376, 377; 356/517, 481, 436; 702/12, 702/50
    See application file for complete search history.

(56) References Cited

U.S. PATENT DOCUMENTS

| | | | |
|---|---|---|---|
| 3,859,851 | A | 1/1975 | Urbanosky |
| 3,934,468 | A | 1/1976 | Brieger |
| 4,860,581 | A | 8/1989 | Zimmerman et al. |
| 5,589,430 | A | 12/1996 | Krahn et al. |
| 5,859,430 | A * | 1/1999 | Mullins et al. ............... 250/255 |
| 5,939,717 | A | 8/1999 | Mullins |
| 6,465,775 | B2 | 10/2002 | Mullins et al. |
| 6,476,384 | B1 | 11/2002 | Mullins et al. |
| 6,737,864 | B2 * | 5/2004 | Prammer et al. ............. 324/303 |
| 7,091,719 | B2 | 8/2006 | Freedman |
| 7,403,292 | B2 * | 7/2008 | Tomaru ........................ 356/517 |
| 2004/0218176 | A1 * | 11/2004 | Shammai et al. ............ 356/326 |

OTHER PUBLICATIONS

Badry et al., Downhole Optical Analysis of Formation Fluids, Oilfield Review, Jan. 1994, pp. 21-28.
Prammer et al., The Downhole NMR Fluid Analyzer, SPWLA 42nd Annual Logging Symposium, Jun. 17-20, 2001, pp. 1-9.
Van Baak, D.A., Resonant Faraday Rotation as a Probe of Atomic Dispersion, American Journal of Physics, vol. 64, No. 6, 1996, pp. 724-773.
Landau, L.D. et al, Electrodynamics of Continuous Media, Permagon Press, 1960, pp. 331-335.
Callen, H.B., Thermodynamics, John Wiley & Sons, 1960, pp. 288-189.
Wattana et al., Characterization of Polarity-Based Asphaltene Subfractions, Energy & Fuels, vol. 19, 2005, pp. 101-110.
Freedman et al., Geophysics, vol. 44, No. 5, 1979, pp. 969-986.

* cited by examiner

*Primary Examiner*—Jay M Patidar
(74) *Attorney, Agent, or Firm*—Dave R. Hofman; Darla Fonseca; Jaime Castano

(57) ABSTRACT

A method for determining a property of earth formations surrounding a borehole includes the following steps: deriving a fluid sample downhole in the borehole, subjecting the sample while downhole to a magnetic field; measuring a magneto-optical shift of a beam of electromagnetic radiation passed through the sample, and determining the property from the measured magneto-optical shift.

35 Claims, 2 Drawing Sheets

MAGNETO-OPTICAL METHOD AND APPARATUS FOR DETERMINING PROPERTIES OF RESERVOIR FLUIDS

FIELD OF THE INVENTION

This invention relates to the field of measuring properties of formations surrounding an earth borehole and, more particularly, to improvements in downhole determination of formation fluid properties.

BACKGROUND OF THE INVENTION

Existing well logging devices can provide useful information about hydraulic properties of formations, such as pressures and fluid flow rates, and can also obtain formation fluid samples, for downhole analysis and/or subsequent uphole analysis. Reference can be made, for example, to U.S. Pat. Nos. 3,859,851, 3,789,575, 3,934,468, and 4,860,581. In a logging device of this general type, known as a formation testing device, a setting arm or setting pistons can be used to controllably urge the body of the logging device against a side of the borehole at a selected depth. The side of the device that is urged against the borehole wall typically includes a packer which surrounds a probe. As the setting arm extends, the probe is inserted into the formation, and the packer then sets the probe in position and forms a seal around the probe, whereupon formation pressure can be measured and fluids can be withdrawn from the formation. A formation testing device in widespread commercial use is the "MDT" (trademark of Schlumberger).

Techniques have been developed for determining substances in fluids of a flow line of a formation testing device such as the MDT. In one technique, the fluid is passed through a chamber in the flow line having sapphire windows, a light source, for example an infrared source, is directed at the chamber, and a spectral detector detects the spectrum of transmitted and/or backscattered or reflected light. These and other techniques have been employed to obtain various types of compositional information. Reference can be made, for example, to U.S Pat. Nos. 5,589,430, 5,939,717, 6,465,775, and 6,476,384, and to Brady et al., "Downhole Optical Analysis for Formation Fluids," Oilfield Review, pp. 21-28, January, 1994. In a form of these devices, the optical density of the NIR radiation as a function of wavelength from about 700 nm to 2500 nm is measured and used to identify fluids based on known absorption peaks of hydrocarbons and water. However, a limitation regarding NIR absorption measurements is that the peaks in the absorption spectra for oil and water are broad and overlapping, which can lead to uncertainty in the differentiation of oil from water. Another device described in the literature employs a Nuclear Magnetic Resonance (NMR) module that is used for monitoring contamination of reservoir fluids by oil base mud filtrate and for identification of reservoir fluids (see M. G. Prammer et al., "The Downhole NMR Fluid Analyzer," paper N presented at the SPWLA Annual Logging Symposium, Jun. 17-20, 2001). The accurate identification of fluids using NMR is based on measuring diffusion contrasts between the fluids. Diffusion measurements require that the fluids be substantially stationary. Accordingly, such measurements are generally not suitable for identification of fluids as they are flowing in a flowline.

Formation testing devices have also been provided with a resistivity sensor that is used to differentiate conductive water (relatively low resistivity) from hydrocarbons (relatively high resistivity). However, resistivity measurements generally cannot distinguish fresh water hydrocarbons or oil from gas.

It is among the objects of the present invention to provide an improved method and apparatus for downhole determination of properties of sampled borehole fluids, which overcome drawbacks and limitations of prior art approaches.

SUMMARY OF THE INVENTION

The present invention makes use of the fact that the optical properties of liquids and solids are modified in the presence of a static (i.e., substantially constant) applied magnetic field. Let a constant magnetic field, in the z-direction, be applied to a liquid or solid sample and let a linearly polarized (e.g., with the electric field along the x-direction) electromagnetic (EM) wave be propagated along the z-direction. On propagating through the sample, the direction of the plane of polarization of the transmitted electromagnetic wave will be rotated relative to that of the incident wave. The angle through which the plane of the polarization vector is rotated is related the Verdet constant (defined below) of the sample. Since the Verdet constants for oil, water, and gas samples are different, measurement of the rotation angle can provide for identification of the fluid type. This effect was observed by Michale Faraday in 1845 and is sometimes called the "Faraday effect" (D. A. Van Baak, "Resonant Faraday Rotation as a Probe of Atomic Dispersion." Am. Journal of Physics, v. 64, no. 6, p. 724-735, 1996).

In accordance with a form of the invention, a method is provided for determining a property of earth formations surround a borehole, including the following steps: deriving a fluid sample downhole in the borehole; subjecting the sample while downhole to a magnetic field; measuring a magneto-optical shift of a beam of electromagnetic radiation passed through said sample; and determining said property from said measured magneto-optical shift. In preferred embodiments, the determined property is the dielectric permittivity of the formation fluid, and/or the Verdet constant of the formation fluid, and/or a molecular property of the formation fluid.

In an embodiment of the invention, the step of subjecting the downhole sample to a magnetic field and determining the magneto-optical shift of a beam of electromagnetic radiation passed through the sample includes subjecting the sample to a static magnetic field; passing a polarized light through the sample; and determining the polarization shift of the light that has passed through the sample. In this embodiment, the steps of passing a polarized light through the sample and determining the polarization shift of the light that has passed through the sample includes: providing an input light source having an input plane of polarization; passing the input light through the sample; measuring the output plane of polarization of output light exiting the sample; and determining the polarization shift as a function of the input plane of polarization and the output plane of polarization. Also in this embodiment, the step of determining the polarization shift as a function of the input plane of polarization and the output plane of polarization comprises determining said polarization shift as a function of the difference between the output plane of polarization and the input plane of polarization.

In an embodiment of the invention, the step of deriving a sample of fluid comprises: providing a logging device in the borehole; causing fluid to pass into a flow line of the logging device; and providing a cell in the flow line that receives the fluid, said cell having substantially transparent region through which said electromagnetic radiation is passed. Preferably, the cell is transmissive of said electromagnetic radiation, although the cell can, for example, have a single transmissive window and an opposing surface that is reflective of electromagnetic radiation, in which case the electromagnetic radiation beam would traverse the sample twice.

In an embodiment of the invention, the step of subjecting the sample to a magnetic field and measuring a magneto-optical shift of a beam of electromagnetic radiation passed through the sample is performed while said sample is in motion, for example, flowing in a flow line. The fluid could also be stationary.

In accordance with a further form of the invention, a method is set forth for determining a property of earth formations surrounding a borehole, including the following steps: deriving a database which relates a number of known parameters of test field samples to test measurements of the magneto-optical shift of light passed through the test samples; deriving a fluid sample downhole in the borehole; subjecting the sample while downhole to a magnetic field and measuring a magneto-optical shift of a beam of electromagnetic radiation passed through said sample; and determining said property of the earth formations by using said measured magneto-optical shift and said database. The property can correspond to one of the known parameters of the test fluid samples, for example, the dielectric permittivity and/or Verdet constant thereof. The known parameters of the test fluid can further comprise temperature and pressure.

Further features and advantages of the invention will become more readily apparent from the following detailed description when taken in conjunction with the accompanying drawings.

DETAILED DESCRIPTION

Figure 1:
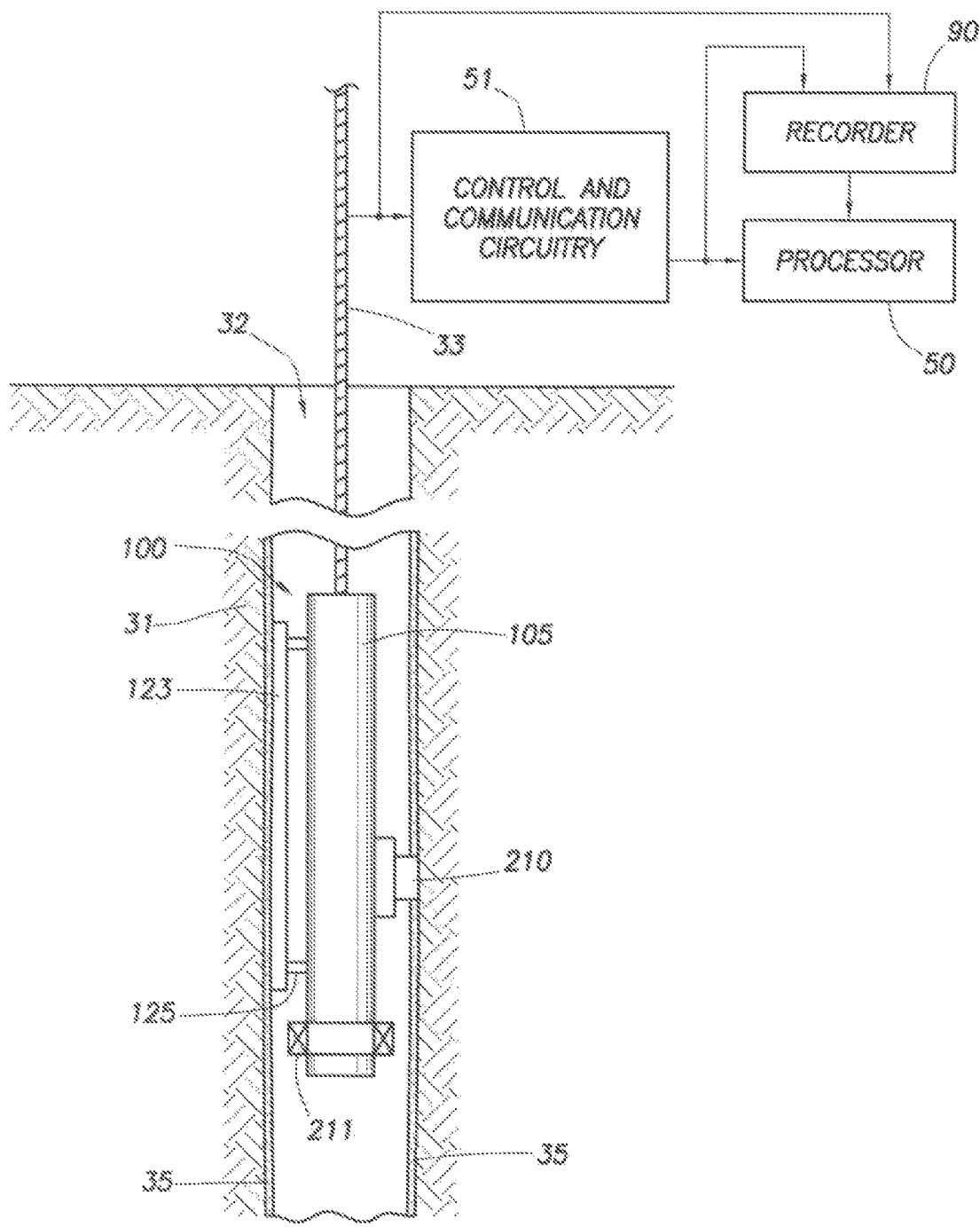
FIG. 1 is a diagram, partially in block form, of an apparatus in which embodiments of the invention can be employed, and which can be used in practicing embodiments of the invention.

Referring to FIG. 1 there is shown a representative embodiment of a so-called "formation testing" apparatus for investigating subsurface formations 31 traversed by a borehole 32, of a type which, when modified as described herein, can be used in practicing embodiments of the invention. Formation testing logging devices are described, for example, in the above-referenced U.S. Pat. Nos. 3,859,851, 3,789,575, 3,934,468 and 4,860,581, and in Badry et al., "Downhole Optical Analysis of Formation Fluids," Oilfield Review, pp. 21-28, January, 1994. The borehole 32 is typically filled with drilling fluid or mud which contains finely divided solids in suspension. A mudcake on the borehole wall is represented at 35. The investigating apparatus or logging device 100 is suspended in the borehole 32 on an armored multiconductor cable 33, the length of which substantially determines the depth of the device 100. Known depth gauge apparatus (not shown) is provided to measure cable displacement over a sheave wheel (not shown) and thus the depth of logging device 100 in the borehole 32. The cable length is controlled by suitable means at the surface such as a drum and winch mechanism (not shown). Circuitry 51, shown at the surface although portions thereof may typically be downhole, represents control and communication circuitry for the logging apparatus. Also shown at the surface are processor 50 and recorder 90. These may all generally be of known type. Although the control and processing associated with embodiments hereof will be performed by downhole and uphole processors of the illustrated equipment, it will be understood that parts of the processing may be performed at locations remote from the borehole, which may be in direct or indirect communication with the wellsite. Also, while preferred embodiments hereof are described in the context of wireline logging equipment, it will be understood that the invention may also have application to logging while drilling, tripping, and/or pausing, or other investigations in an earth borehole.

The logging device or tool 100 has an elongated body 105 which encloses the downhole portion of the device, controls, chambers, measurement apparatus, etc. One or more arms 123 can be mounted on pistons 125 which extend, e.g. under control from the surface, to set the tool. One or more packer modules are represented by the reference numeral 211. The logging device includes one or more probe modules each of which includes a probe assembly 210 which is movable with a probe actuator (not separately shown) and includes a probe (not separately shown) that is outwardly displaced into contact with the borehole wall, piercing the mudcake and communicating with the formations, and a packer for hydraulic isolation. The equipment and methods for taking pressure measurements and doing sampling are well known in the art, and the logging device 100 is provided with these known capabilities. Reference can be made, for example, to the above-referenced patents and publication.

Modern commercially available well logging services utilize, for example, a form of a formation tester tool called the modular formation dynamics tester ("MDT"—trademark of Schlumberger), of the general type described in the above-referenced Badry et al. publication, which can provide a variety of measurements and samples, as the tool is modularized and can be configured in a number of ways. Examples of some of the modules employed in this type of tool, are as follows: An electric power module is generally provided, and is typically, but not the first (top) module in the string. A hydraulic power module provides hydraulic power to all modules that may require same, and such power can be propagated via a hydraulic bus. Probe modules, which can be single or plural probes, includes pistons for causing engagement of probe(s) for fluid communication with the formations. Sample modules contain sample chambers for collecting samples of formation fluids, and can be directly connected with sampling points or connected via flowline. A pumpout module can be used for purging unwanted fluids. An analyzer module uses optical analysis to identify certain characteristics of fluids. A packer module includes inflatable packer elements which can seal the borehole circumference over the length of the packer elements. Using the foregoing and other types of modules, the tool can be configured to perform various types of functions. Embodiments of the present invention have application to tool configurations which draw formation fluid into the tool, the tool having a flow line in which the fluid is contained and can flow.

Figure 2:
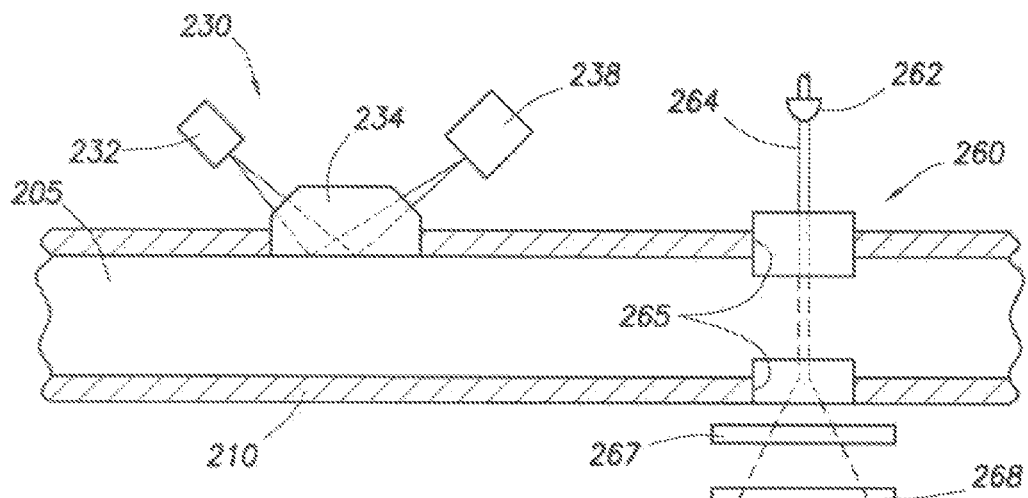
FIG. 2 is a diagram of a flow line of the FIG. 1 device, the flow line containing formation fluids, and of equipment of a type that has been utilized in the prior art to obtain measurement regarding formation fluids.

FIG. 2 shows a flow line 210 of the FIG. 1 device containing formation fluid 205. As described, for example, in Badry et al., supra, two sensor subsystems are provided; subsystem 260 for liquid detection and analysis, and subsystem 230 for gas detection. In subsystem 260, absorption spectroscopy is used to detect and analyze liquid. A light source, such as lamp 262, directs a beam of light 264 through sapphire window 265 and the fluid 205 in the flow line 210 and the exiting beam is distributed by spectral distributor 267 and detected by an array 268 of photodiode detectors which are tuned to different wavelength. In this manner, the absorption spectrum of the fluid is determined. As described in Badry et al., supra, water absorbs very little light in the visible region. This continues at the shorter wavelengths in the near infrared region until a resonance in the molecular vibration of the oxygen-hydrogen [O—H] bond causes a sudden increase in absorption forming a peak near 1450 nanometers (nm). Another resonance in the O—H bond causes a second, much stronger, peak near 2000 nm. For oils, molecular vibration absorption peaks at 1700 nm, caused by a resonance vibration in the C—H bond. The separation of these peaks can permit differentiation of oil and water although, as first indicated above, there can be ambiguity as a result of overlap. Color provides another parameter for liquid identification.

In subsystem 230, light from a light-emitting diode 232 is polarized by a polarizer (not separately shown), focused by a lens (not separately shown), and spread over a range of incident angles by a sapphire prism 234 which is also a window on flow line 210. A detector array 238 measures the reflection intensity over angles from just below the Brewster angle for air to just below the critical angle for water. As described in Badry et al., supra, since values for the Brewster and critical angles differ significantly between gases and liquids, measuring the relative intensity of the reflected light over a range of angles permits positive identification of gas. Using both angles is desirable to detect gas in the presence of liquids.

Theory relating to the invention will next be described.

The dielectric tensor, in the absence of an applied static magnetic field ($\vec{H}_u$), for an electromagnetically isotropic liquid, e.g., a petroleum liquid or gas, is diagonal such that, $\epsilon_{i,j}=\delta_{i,j}\epsilon$, where $\delta_{i,j}$ is the well-known Kronecker delta. An applied static magnetic field in the z-direction couples the x- and y-directions so that the dielectric tensor has off-diagonal components. The effect of this coupling is to create two independent modes of propagation with different speeds (indices of refraction) for left and right circularly polarized electromagnetic (EM) waves propagating along the static field. An incident linearly polarized EM wave propagating along the static field will excite both of these modes, on entering the sample, which then propagate independently in the sample. The rotation angle ($\theta$) of the plane of polarization of the transmitted EM wave is related to the "Verdet constant" (V) of the sample, i.e., $$\theta = V \cdot L \cdot H_0, \qquad (1)$$

where L is the length of the sample transversed by the wave and $H_0$ is the magnitude of the static field. The Verdet constant is, in fact, not a constant but a function of the electronic and molecular properties of the specific field (i.e., oil, gas, water, oil base mud filtrate or a combination or mixture of these fluids), the free-space wavelength or frequency of the EM wave, and the dielectric constant of the substance in the absence of a static magnetic field. For reservoir fluids it will also be a function of the temperature and pressure at which the measurements are conducted.

The derivation of Eq. (1) is similar to the one given by L. D. Landau and E. M. Lifshitz in *Electrodynamics of Continuous Media*, Permagon Press, 1960, p. 331-335. The derivation starts with two of Maxwell's equations written in Gaussian units for a non-magnetic medium ($\vec{B}=\vec{H}$) which is assumed to be transparent (i.e., a non-absorbing medium) for a given range of frequencies, $$\nabla \times \vec{E} = -\frac{1}{c}\frac{\partial \vec{H}}{\partial t} \qquad (2)$$

and, $$\nabla \times \vec{H} = \frac{1}{c}\frac{\partial \vec{D}}{\partial t}. \qquad (3)$$

The assumption of a non-absorbing medium is not essential and the derivation given here can easily be generalized to account for the attenuation of the EM wave by different loss mechanisms. In the above equation, c, is the speed of light in a vacuum, $\vec{E}$ and $\vec{H}$, time and spatially varying electric and magnetic fields, respectively. The electric displacement vector, $\vec{D}$, is related to the electric field via the complex dielectric tensor, e.g., $$D_i = \epsilon_{i,j} E_j, \qquad (4)$$

where the Einstein summation convention has been used, i.e., repeated indices are summed over in all tensor equations. Here the dielectric tensor is complex because of the presence of the static field. For plane wave propagation the space and time variation of all quantities is proportional to, $e^{j(\vec{k}\cdot\vec{y}-\omega i)}$, so that Eqs. (2)-(3) can be combined and written in the form.

$$\vec{k}\times(\vec{E}\times\vec{k}) = \frac{\omega}{c}\vec{D}, \qquad (5)$$

or alternatively as, $$\vec{D} = n^2\vec{E} - (\vec{n},\vec{E})\vec{n} \qquad (6)$$

where the real wave vector, $$\vec{k} = \frac{\omega}{c}\vec{n},$$

for the transparent medium is expressed in terms of the index of refraction ($\vec{n}$) vector, a real quantity, that determines direction and speed of the EM wave. The index of refraction vector would be complex for an absorbing medium and the imaginary part would account for the attenuation of the EM wave. Let us choose a co-ordinate system with $\vec{n}$ along the z-axis. Then, using (6) the equation for the transverse components assumes the form.

$$D_\alpha = n^2 E_\alpha \qquad (7)$$

where, $\alpha$ is equal to x or y. Using Eq. (4) one can re-write the above equation in the form, $$D_\alpha = n^2 \epsilon_{\alpha,\beta}^{-1} D_\beta = n^2(\eta'_{\alpha,\beta} + i\eta^*_{\alpha,\beta}) D_\beta \qquad (8)$$

In the above equation, the complex matrix, $\eta = \epsilon^{-1}$ has been introduced, that is, the inverse of the complex dielectric tensor and the imaginary number, $i=\sqrt{-1}$ has been used. Eq. (8) represents a pair of homogeneous equations for the transverse components of the electric displacement vector and can be written in the form.

$$(\delta_{\alpha,\beta} - n^2\eta'_{\alpha,\beta} - in^2\eta^*_{\alpha,\beta})D_\beta = 0 \qquad (9)$$

The vanishing of the determinant of the coefficient in the two equations gives the indices of refraction of the two normal modes of propagation in the fluid for right and left circularly polarized waves. Before proceeding with the derivation of the modes of propagation, it s convenient to pause and consider the symmetry of the dielectric tensor in the presence of the applied magnetic field. From general symmetry principles of kinetic coefficients, often referred to as the Onsager theorem (e.g., see H. B. Callen, *Thermodynamics*, John Wiley & Sons, 1960, p. 288-289) it is required that, $$\epsilon_{i,k}(H_0) = \epsilon_{k,j}(-H_0) \quad (10)$$

Moreover, in a non-absorbing medium the dielectric tensor must be Hermitian, i.e., $\epsilon_{i,k} = \epsilon_{k,j}^*$, where the superscript denotes complex conjugation. The latter implies that the real and imaginary parts of the dielectric constant are symmetrical and anti-symmetrical, respectively. Therefore, on using Eq. (10) one can write the equations, $$\epsilon'_{i,k}(H_0) = \epsilon'_{i,k}(-H_0) \quad (11a)$$

and, $$\epsilon^*_{i,k}(H_0) = -\epsilon^*_{i,k}(-H_0) \quad (11b)$$

which show that the real and imaginary parts of the dielectric tensor are even and odd functions, respectively of the static magnetic field. The same arguments can be given for the inverse tensor defined in Eq. 8, i.e., $\epsilon_{i,k}^{-1} = \eta_{i,k} = \eta^*_{i,k} + i\eta^*_{i,k}$, whose real and imaginary parts must satisfy the same symmetry conditions. Therefore, since any second rank antisymmetric tensor is equivalent or dual to an axial vector the imaginary part of the inverse dielectric tensor in Eq. (8) can be written as follows:

$$\eta^*_{\alpha,\beta} = \epsilon_{\alpha,\beta,\gamma} G_\gamma \quad (12)$$

where $\epsilon_{\alpha\beta\gamma}$ is the fully antisymmetric unit tensor known as the Levi-Civta tensor. It has the value +1 for cyclic order of the indices x, y, and z and −1 for non-cylic order. It has the value 0 if two or more of its indices are equal. Thus, the non-zero (transverse) elements in Eq. (12) are, $$\eta^*_{x,y} = -\eta^*_{y,x} = G_x \quad (13)$$

The gyration vector $G_y$ in Eq. (12) vanishes in the absence of the applied static field and therefore to first order in $H_0$ one can write, $$G_\alpha = \eta H_\beta \quad (14)$$

where cubic and higher order terms in $H_0$ are neglected since these effects are usually small for static magnetic field strengths used in practice. The proportionality parameter, f, in the above equation will in general depend, among other things, on the molecular and electronic properties of the specific liquid, the frequency of the measurement, temperature, and pressure.

Combining Eqs. (9) and (13) one finds the pair of homogeneous equations, $$\left(1 - \frac{n^2}{\varepsilon}\right) D_x - in^2 G_z D_y = 0 \quad (15a)$$

and, $$in^2 G_z D_x + \left(1 - \frac{n^2}{\varepsilon}\right) D_y = 0. \quad (15b)$$

Eqs. (15a, 15b) were obtained by neglecting second order terms in $H_0$ and making the replacements, $\eta_{xx}^i = \eta_{yy}^i = \epsilon_{xx}^{-1} = \epsilon^{-1}$, where $\epsilon$ is the dielectric constant of the isotropic fluid in the absence of the applied static magnetic field. Setting the determinant of the two linear homogeneous Eqs. (15a, 15b) for the transverse components of the electric displacement vector to zero leads to an equation for two indicies of refraction that correspond to independently propagating modes, e.g., $$\left(1 - \frac{n^3}{\varepsilon}\right)^2 - n^4 G_z^2 = 0. \quad (16)$$

To lowest order in $H_0$ one can replace $n^4$ by $n_0^4$ in Eq. (16) where $n_0 = \sqrt{\varepsilon}$ is the index of refraction of the fluid in the absence of the static magnetic field, which leads to two indicies of refraction ($n_x$) corresponding to left and right circularly polarized EM waves. One therefore finds that to lowest order in the static field, $$n_x \equiv n_0 \left(1 \mp \frac{n_0^2 G_z}{2}\right). \quad (17)$$

On taking the square root of both sides of Eq. (16) and substituting the result into Eqs. (15) one can show that the two modes of propagation do indeed correspond to left and right circularly polarized waves, i.e., $$D_x = \mp i D_y \quad (18)$$

which corresponds to circular polarized waves since the magnitudes of $D_x$ and $D_y$ are equal and their phases differ by 90 degrees.

To compute the phase rotation, let a linearly polarized wave propagating in the z-direction be incident on a flowline of a reservoir filled with a sample of reservoir fluid of thickness L (e.g., corresponding to the inside diameter of the flowline). Moreover, let the direction of the vector electric field $\vec{E}$ ($= \vec{D}$) of the incident EM wave be the x-axis. The incident wave could either be monochromatic, e.g., a laser source or from a polychromatic source like the lamp used in the Optical Fluid Analyzer of Badry et al., supra. The incident and transmitted wave can be represented as the sum of the two circular modes of propagation with opposite directions of rotation, i.e., the x-component of the electric displacement vector is, $$D_x = \left(\frac{\vec{D}_s + \vec{D}}{2}\right)_x \quad (19a)$$

and the y-component, $$D_y = \left(\frac{\vec{D}_s + \vec{D}}{2}\right)_y \quad (19b)$$

where the circularly polarized displacement vectors are defined by, $$\vec{D}_x = D_0(\hat{x}e^{ik_\pm z} \pm i\hat{y}e^{ik_\mp z}), \quad (20)$$

where $k_\pm = \frac{\omega}{c}n_\pm$.

On substituting Eqs. (20) into Eqs. (19) one finds that $$D_x = \frac{D_\pm}{2}(e^{ik_+z} + e^{ik_-z}) \quad (21a)$$

and, $$D_y = \frac{iD_o}{2}(e^{ik_+z} - e^{ik_-z}). \quad (21b)$$

Note the incident wave at z=0 is linearly polarized in the x-direction. As the wave propagates through the fluid a non-zero value of $D_y$ develops leading to a rotation of the plane of polarization. Eqs. (21) can be written in the form, $$D_x = D_0 e^{ikz} \cos \kappa z \quad (22a)$$

and, $$D_y = D_0 e^{ikz} \sin \kappa z. \quad (22b)$$

where $k = \frac{k_+ + k_-}{2}$, and $\kappa = \frac{k_+ - k_-}{2}$.

The angle of rotation of the plane of polarization after the EM wave has propagated through the fluid in the flowline of a fluid sampling tool is given by, $$\theta = \tan^{-1}\frac{D_y}{D_x} = \kappa L, \quad (23)$$

or using definitions given above (e.g., k, $k_4$ and $k_m$) and Eq. 17 one finds that, $$\theta = \frac{\omega L}{2c}(n_+ - n_-) = -\frac{\omega L \varepsilon^{3/2} G_z}{2c} = -\frac{\omega L \varepsilon^{3/2} f H_c}{2c}. \quad (24)$$

Using Eqs. (1) and (24) the Verdet constant is given by, $$V = -\frac{\omega \varepsilon^{3/2} f}{2c}. \quad (25)$$

As noted above, the factor, f, will depend on the molecular and electronic properties of the specific liquid, the frequency of the measurement, temperature, and pressure.

A measurement of the Faraday rotation angle, and therefore Verdet constant, of EM waves propagated through the fluid in the downhole flowline provides a means for distinguishing water, oil, and gas since these fluids have very different dielectric constants (R. Freedman and J. P. Vogiatzis in Geophysics, v. 44, no. 5, 969-986, 1979). For multiphase flow of two phases, e.g., water and oil, the measured Verdet constant (V) is an apparent value. If the Verdet constants of the water ($V_{water}$) and oil ($V_{oil}$) are known either empirically or theoretically, then a mixing rule can be used to determine the relative volumes of water and oil present in the flowline, e.g., $$V^c = \alpha_{oil} V_{oil}^c + (1-\alpha_{oil}) V_{water}^c \quad (26)$$

where c is an empirically determined constant, $\alpha_{oil}$ is the relative volume of oil, and, $1-\alpha_{oil}$, is the relative volume of water or the water cut.

If the factor, f, in the definition of the Verdet constant is independently measured or determined by empirical or theoretical means, then one can determine the dielectric constant of the fluid in the flowline which, provides a new way of measuring the amount of oil base mud filtrate (OBMF) contamination of a sample of reservoir oil. For example, suppose that an oil base mud is used for which the OBMF has a large and known dielectric constant ($\epsilon_{OBMF}$) (e.g., say 25) compared to that of native crude oils ($\epsilon_{oil}$). Then the OBMF contamination can be estimated from a dielectric constant mixing law, e.g., $$\sqrt{\epsilon} = \alpha_{oil}\sqrt{\epsilon_{oil}} + (1-\alpha_{oil})\sqrt{\epsilon_{OBMF}} \quad (27)$$

where, $\alpha_{oil}$, is the fractional volume of native oil in the contaminated sample. Other dielectric mixing laws can also be used to determine the contamination. OBMF filtrates of commonly used synthetic and natural oilbase drilling muds have dielectric constants similar to those of native reservoir crude oils. Therefore, this method for predicting contamination requires using special oilbase drilling muds that have been chemically prepared to enhance the dielectric constant (e.g., by addition of polar molecules).

The above derivation of the Faraday rotation angle neglected the effects of attenuation of the EM wave as it propagates through the fluid. A complex wave vector, e.g., can describe the effect of attenuation, $$k = \frac{\omega}{c}(n + i\beta). \quad (28)$$

For reservoir fluids the attenuation constants for right and left circularly polarized waves should be equal so that, $\beta_x = \beta_y = \beta$. The effect of attenuation is to multiply the right hand sides of Eqs. (22a)-(22b) by a common attenuation factor, $e^{-\beta z}$, which cancels and leads to the same Faraday rotation angle given in Eq. (24) for the case of a transparent medium with $\beta=0$. D. A. Van Baak, in "Resonant Faraday Rotation as a Probe of Atomic Dispersion," in Am. Journal of Physics, v. 64, no. 6, p. 724-735, 1996 treats the case where the attenuation factors are different for left and right circularly polarized light.

Another application of embodiments hereof is for the characterization of asphaltene concentrations in crude oils. A paper by P. Wattana et al. published in Energy & Fuels, v. 19, 101-110, 2005 shows that the percent weight of asphaltenes in solutions of toluene can be predicted from either measured dielectric constants of indices of refraction of the solutions.

Another potential application includes determining molecular structure information from Faraday rotation measurements made at multiple EM wave frequencies. The frequency dependent dielectric and Verdet constants can provide dynamic information on molecular sizes, species, and interactions. One approach to obtaining molecular structure information from the magneto-optics measurements is to construct a database of such measurements and corresponding molecular properties for representative suites of crude oils. Then, by interpolation within this database, molecular properties can be predicted from measurements made on samples that are not in the database (e.g., using the methods of U.S. Pat. No. 7,091,719).

Figure 3:
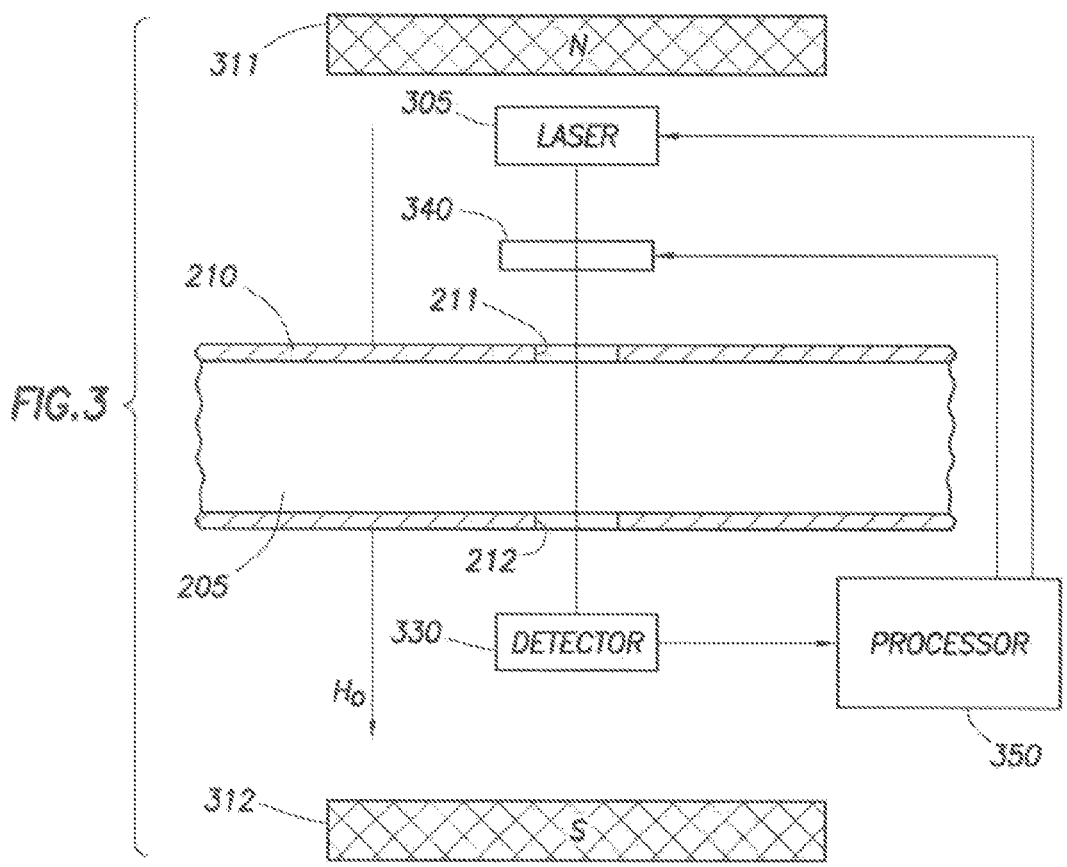
FIG. 3 is a diagram, partially in block form, of an apparatus in accordance with an embodiment of the invention and which can be used in practicing embodiments of the method of the invention.

An embodiment hereof, as shown in FIG. 3, utilizes a tunable laser source 305 of polarized electromagnetic waves with a frequency selected to be in a range of low attenuation of water, live oils, and reservoir gases. Alternatively, a broad frequency source of non-polarized light can be used together with a polarizing and frequency selective filter to polarize and filter the radiation. The flowline, in this embodiment, has two windows, 211 and 212, that are transparent to the laser radiation. In this regard, the type of flowline and windows already in use, as in FIG. 2 above, can be utilized to advantage and adapted to the other feature thereof. A permanent magnet or electro-magnet (e.g., a pair of Helmholtz coils) can be used to produce a static magnetic field parallel to the direction of propagation of the polarized EM wave. The direction of polarization of the incident wave is normal to the direction of propagation. Additionally, a polarization sensitive optical receiver (detector 330) is used to detect the polarized wave that is transmitted through the flowline. The instrumentation is calibrated to subtract the rotation of the plane of polarization produced by the sapphire windows. In the embodiment of FIG. 3, a permanent magnet, 311 and 312, having the indicated polarities, or magnet array, is provided. The magnet creates a static magnetic field perpendicular to the flowline. The laser source 305, which may be a laser diode, emits monochromatic EM radiation, which is polarized by a polarizer 340. If the laser emits polarized light, the polarizer may not be required. The light passes through the transparent window in the flowline and propagates through the reservoir fluid in the flowline. The polarization detector measures the polarization direction of the transmitted light. A downhole processor, which can be coupled with the uphole processor 50 (FIG. 2), can be used to determine the Faraday rotation angle and any of the parameters described herein, from the measurements, it being understood that suitable division of tasks between processors can be implemented. The processor can also control operation of the laser source and the polarizer, as well, if an electro-optical polarizer is used.

What is claimed is:

1. Apparatus for determining a property of earth formations surrounding a borehole, comprising:
    a device deployed in the borehole for obtaining a sample of fluid;
    a magnet in said device for subjecting said sample to a magnetic field;
    a source of polarized electromagnetic radiation in said device for passing a beam of polarized electromagnetic radiation through said sample; and
    a detector for detecting the magneto-optical shift of said beam of polarized electromagnetic radiation passed through the sample.

2. Apparatus as defined by claim 1, wherein said property is the dielectric permittivity of the fluid of said earth formations.

3. Apparatus as defined by claim 1, wherein said property is the Verdet constant of the fluid of said earth formations.

4. Apparatus as defined by claim 1, wherein said property is a molecular property of the fluid of said earth formations.

5. A method for determining a property of earth formations surrounding a borehole, comprising the steps of:
    deriving a fluid sample downhole in the borehole;
    subjecting the sample while downhole to a magnetic field;
    measuring a magneto-optical shift of a beam of electromagnetic radiation passed through said sample; and
    determining said property from said measured magneto-optical shift.

6. The method as defined by claim 5, wherein said property is the dielectric permittivity of the fluid.

7. The method as defined by claim 6, further comprising determining asphaltene concentration from said dielectric permittivity of the fluid.

8. The method as defined by claim 6, further comprising determining water cut in the fluid from said dielectric permittivity of the fluid.

9. The method as defined by claim 6, further comprising determining the extent of contamination of the fluid by drilling fluid from said dielectric permittivity of the fluid.

10. The method as defined by claim 6, further comprising determining the fluid types and fractional volumes of the fluid from said dielectric permittivity of the fluid.

11. The method as defined by claim 6, wherein said steps of subjecting the sample to a magnetic field and determining the magneto-optical shift of a beam of electromagnetic radiation passed through the sample include subjecting the sample to a static magnetic field; passing polarized light through said sample; and determining the polarization shift of the light that has passed through the sample.

12. The method as defined by claim 5, wherein said property is the Verdet constant of the fluid.

13. The method as defined by claim 5, wherein said property is a molecular property of the fluid.

14. The method as defined by claim 5, wherein said steps of subjecting the sample to a magnetic field and determining the magneto-optical shift of a beam of electromagnetic radiation passed through the sample include subjecting the sample to a static magnetic field; passing polarized light through said sample; and determining the polarization shift of the light that has passed through the sample.

15. The method as defined by claim 14, wherein said steps of passing polarized light through said sample and determining the polarization shift of the light that has passed through the sample comprises:
    providing an input light having an input plane of polarization;
    passing the input light through the sample;
    measuring an output plane of polarization of output light exiting the sample; and
    determining the polarization shift as a function of the input plane of polarization and the output plane of polarization.

16. The method as defined by claim 15, wherein said step of determining the polarization shift as a function of the input plane of polarization and the output plane of polarization comprises determining said polarization shift as a function of the difference between the output plane of polarization and the input plane of polarization.

17. The method as defined by claim 14, wherein said step of deriving a sample of fluid comprises: providing a logging device in the borehole; causing the fluid to pass into a flow line of the logging device; and providing a cell in the flow line that receives the fluid, said cell having a substantially transparent region through which said electromagnetic radiation is passed.

18. The method as defined by claim 17, wherein said step of subjecting the sample to a magnetic field comprises providing a magnet in said logging device, and wherein said steps of passing polarized light through the sample and determining the polarization shift of the light that has passed through the sample are performed in said logging device.

19. The method as defined by claim 5, wherein said step of deriving a sample of fluid comprises: providing a logging device in the borehole; causing the fluid to pass into a flow line of the logging device; and providing a cell in the flow line that receives the fluid, said cell having a substantially transparent region through which said electromagnetic radiation is passed.

20. The method as defined by claim 19, wherein said cell is transmissive of said electromagnetic radiation.

21. The method as defined by claim 19, wherein said cell is reflective of said electromagnetic radiation.

22. The method as defined by claim 5, wherein said sample comprises fluid obtained from one or more of the formations.

23. The method as defined by claim 5, wherein said sample comprises fluid obtained from drilling fluid in the borehole.

24. The method as defined by claim 5, wherein said method is performed by a device suspended in said borehole on a wireline.

25. The method as defined by claim 5, wherein said method is implemented by a tool on a drill string.

26. The method as defined by claim 5, wherein at least a part of said step of determining said property from said measured magneto-optical shift is performed downhole.

27. The method as defined by claim 5, wherein at least a part of said step of determining said property from said measured magneto-optical shift is performed uphole.

28. The method as defined by claim 5, wherein said steps of subjecting the sample to a magnetic field and measuring a magneto-optical shift of a beam of electromagnetic passed through the sample is performed while said sample is substantially stationary.

29. The method as defined by claim 5, wherein said steps of subjecting the sample to a magnetic field and measuring a magneto-optical shift of a beam of electromagnetic radiation passed through the sample is performed while said sample is in motion.

30. The method as defined by claim 5, wherein said steps of subjecting the sample to a magnetic field and measuring a magneto-optical shift of a beam of electromagnetic radiation passed through the sample is performed while said sample is flowing in a flow line.

31. A method for determining a property of earth formations surrounding a borehole, comprising the steps of:
deriving a database that relates a number of known parameters of test fluid samples to test measurements of the magneto-optical shift of light passed through the test samples;
deriving a fluid sample downhole in the borehole;
subjecting the sample while downhole to a magnetic field and measuring a magneto-optical shift of a beam of electromagnetic radiation passed through said sample; and
determining said property of the earth formations by using said measured magneto-optical shift and said database.

32. The method as defined by claim 31, wherein said property corresponds to one of the known parameters of the test fluid samples.

33. The method as defined by claim 32, wherein said known parameters of the test fluid comprise dielectric permittivity, temperature, and pressure.

34. The method as defined by claim 31, wherein said property is the dielectric permittivity of the fluid.

35. The method as defined by claim 31, wherein said property is the Verdet constant of the fluid.

* * * * *